US007922254B2

(12) United States Patent
Squires et al.

(10) Patent No.: US 7,922,254 B2
(45) Date of Patent: Apr. 12, 2011

(54) PRISONER SEAT SECURITY DEVICE

(76) Inventors: Keith D. Squires, Morgan, UT (US); Omar L. Issa, Venice, UT (US)

( * ) Notice: Subject to any disclaimer, the term of this patent is extended or adjusted under 35 U.S.C. 154(b) by 0 days.

(21) Appl. No.: 12/253,800

(22) Filed: Oct. 17, 2008

(65) Prior Publication Data

US 2009/0102271 A1 Apr. 23, 2009

Related U.S. Application Data

(60) Division of application No. 11/396,330, filed on Mar. 31, 2006, which is a continuation of application No. 10/947,999, filed on Sep. 23, 2004, now abandoned.

(51) Int. Cl.
*B60R 22/343* (2006.01)

(52) U.S. Cl. ........................................ 297/485; 297/477

(58) Field of Classification Search ............... 297/250.1, 297/254, 474–477, 485
See application file for complete search history.

(56) References Cited

U.S. PATENT DOCUMENTS

| | | | | | |
|---|---|---|---|---|---|
| 1,823,697 | A | | 9/1931 | Nenstiehl | |
| 2,150,368 | A | | 9/1931 | Fitzgerald et al. | |
| 2,403,653 | A | * | 7/1946 | Geohegan et al. | 297/480 |
| 2,645,922 | A | | 7/1953 | Martin | |
| 2,701,693 | A | * | 2/1955 | Nordmark et al. | 297/216.1 |
| 2,830,655 | A | | 4/1958 | Lalande | |
| 2,949,761 | A | | 8/1960 | Mitchell et al. | |
| 3,007,331 | A | | 11/1961 | Irwin | |
| 3,281,818 | A | | 10/1966 | Morgan et al. | |
| 3,321,247 | A | * | 5/1967 | Dillender | 297/465 |
| 3,385,633 | A | * | 5/1968 | Aizley | 297/473 |
| 3,992,040 | A | | 11/1976 | Gannac | |
| 4,173,974 | A | | 11/1979 | Belliveau | |
| 4,245,856 | A | | 1/1981 | Ziv | |
| 4,384,735 | A | | 5/1983 | Maeda et al. | |
| 4,461,493 | A | | 7/1984 | Doty | |
| 4,467,493 | A | | 8/1984 | Buchtel | |
| 4,506,912 | A | | 3/1985 | Ahad | |
| 4,621,835 | A | | 11/1986 | Edwards | |
| 4,728,553 | A | | 3/1988 | Daniels | |
| 4,789,183 | A | | 12/1988 | Wolfer | |
| 4,874,203 | A | * | 10/1989 | Henley | 297/250.1 |
| 4,925,246 | A | | 5/1990 | Corcoran | |
| 4,949,679 | A | | 8/1990 | Wolfer | |
| 4,995,672 | A | | 2/1991 | Corcoran | |
| 5,050,906 | A | | 9/1991 | Kneip | |
| 5,261,728 | A | | 11/1993 | Carmichael | |
| 5,345,947 | A | | 9/1994 | Fisher | |
| 5,511,856 | A | * | 4/1996 | Merrick et al. | 297/476 |
| 5,544,363 | A | * | 8/1996 | McCue et al. | 297/465 |

(Continued)

FOREIGN PATENT DOCUMENTS

EP 364303 A2 4/1990

*Primary Examiner* — Peter R. Brown
(74) *Attorney, Agent, or Firm* — Bateman IP Law Group

(57) ABSTRACT

A prisoner seat security device includes a retractable strap which attaches to a prisoner, preferably by a restraint device on the prisoner, such as hand-cuffs. As the prisoner sits in the seat, the strap retracts. The officer can then lock the retraction mechanism so that the strap will not extend and the prisoner is held in place. When it is desired for the prisoner to get out of the chair, the lock is released, allowing the prisoner to stand and the strap to be disconnected.

19 Claims, 4 Drawing Sheets

U.S. PATENT DOCUMENTS

| | | | | | |
|---|---|---|---|---|---|
| 5,546,962 | A | | 8/1996 | Power | |
| 5,568,939 | A | * | 10/1996 | Blackburn et al. | 280/806 |
| 5,581,853 | A | | 12/1996 | Miller et al. | |
| 5,680,781 | A | | 10/1997 | Bonds et al. | |
| 5,749,130 | A | | 5/1998 | Bilyeu et al. | |
| 5,755,235 | A | * | 5/1998 | Magiawala et al. | 297/468 |
| 5,779,319 | A | * | 7/1998 | Merrick | 297/484 |
| 6,026,661 | A | | 2/2000 | Spiropoulos | |
| 6,138,677 | A | | 10/2000 | DeVane | |
| 6,267,441 | B1 | * | 7/2001 | Otero | 297/254 |
| 6,312,056 | B1 | * | 11/2001 | Murphy et al. | 297/464 |
| 6,360,747 | B1 | | 3/2002 | Velarde et al. | |
| 6,368,262 | B1 | | 4/2002 | Willoughby et al. | |
| 6,406,230 | B1 | | 6/2002 | Mason et al. | |
| 6,655,718 | B2 | * | 12/2003 | Eusebi | 280/801.1 |
| 6,676,219 | B1 | * | 1/2004 | Brewer | 297/485 |
| 6,718,894 | B2 | | 4/2004 | Whaley | |
| 6,725,865 | B2 | | 4/2004 | Chapman | |
| 6,874,506 | B2 | | 4/2005 | Chapman | |
| 7,077,475 | B2 | * | 7/2006 | Boyle | 297/250.1 |
| 7,140,571 | B2 | | 11/2006 | Hishon et al. | |
| 7,210,317 | B2 | | 5/2007 | Beane et a | |
| 7,340,926 | B2 | | 3/2008 | Kim et al. | |
| 7,481,399 | B2 | * | 1/2009 | Nohren et al. | 244/122 R |
| 2007/0046014 | A1 | | 3/2007 | Glover et al. | |
| 2007/0063505 | A1 | | 3/2007 | Eusebi | |
| 2007/0145087 | A1 | | 6/2007 | Mikesell et al. | |
| 2007/0181079 | A1 | | 8/2007 | Fong | |
| 2008/0072844 | A1 | | 3/2008 | Konigsberg | |
| 2008/0168603 | A1 | | 7/2008 | Ayette et al. | |
| 2008/0314336 | A1 | | 12/2008 | Church et al. | |

* cited by examiner

PRISONER SEAT SECURITY DEVICE

RELATED APPLICATIONS

The present application is a divisional of U.S. patent application Ser. No. 11/396,330, filed Mar. 31, 2006, which is expressly incorporated herein, and which is a continuation of U.S. patent application Ser. No. 10/947,999, filed Sep. 23, 2004 now abandoned.

BACKGROUND OF THE INVENTION RELATED APPLICATIONS

Law enforcement, correction security, and military personnel transport handcuffed or otherwise fettered prisoners in various vehicles from one location to another. Traditionally, a police officer arrests a suspect and places him/her into handcuffs. The prisoner is then placed in the police vehicle, which is often equipped with an aftermarket cage that prevents the suspect from exiting the back seat compartment. The cage requires hard installation to the vehicle and prevents the rear passenger compartment from being utilized for other purposes. Many officers and departments forego the use of a cage and place the handcuffed prisoner in the front passenger seat and then only use a seatbelt to restrain the prisoner. This practice can allow prisoners to move around freely enough to unlatch the seatbelt, unlock and open the vehicle's door to escape, and in some circumstances to move the handcuffs from behind the back to the front, which facilitates a possible assault on the officer or unlawful operation of the police vehicle.

SUMMARY OF THE INVENTION

The preferred application of this invention incorporates a mounting apparatus that hangs over the back of a front passenger side vehicle seat and is fastened to the seat. Towards the bottom of the mounting apparatus is attached a housing which contains a spring-loaded spool, wrapped with a nylon strap that can be rendered locked in place by means of an electronic braking device which is operated by a remote switch.

The nylon strap exits the housing and travels through the vehicle seat to the front. The spool is in its inactive mode, which allows the strap to be extracted freely. The police officer (operator) walks a handcuffed or similarly fettered prisoner to the front passenger door of his police vehicle. He then attaches the retractable nylon strap to the chain between the handcuffs by means of a clasp. The suspect then sits down into the seat as the nylon strap self retracts into its housing through the seat. When the suspect is seated against the seat-back, the operator activates a remote-controlled switch which causes a 12-volt current to engage the spool's braking mechanism and preventing the nylon strap from again being extracted. This action holds the prisoner's body and hands in place against the seat and prevents him/her from being able to move sufficiently enough to unlatch the seatbelt, unlock and open the door, or move their handcuffs to the front. This prevents their ability to assault the officer or operate the police vehicle.

By having the prisoner secured in such a manner, the police officer can then go about his other necessary duties which may include: dealing with other suspects, searching or inventorying a vehicle, talking with victims and witnesses. When a lone officer has more than one suspect, this device allows him the ability to secure multiple prisoners in his vehicle while preventing their ability to move sufficiently to physically interact with each other.

After concluding his on-scene duties, the officer is able to transport the prisoner from the scene to the police station or correctional facility for processing, knowing that the prisoner is secure and unable to make hazardous movements. After transport, the officer opens the prisoner's door and releases the electronic brake by means of the remote-controlled switch. The prisoner is directed to stand up and exit out of the vehicle. The officer can then unhook the nylon strap and escort the prisoner into the facility.

The prime innovation of this invention is that it provides a retractable and locking device specifically designed to secure a handcuffed prisoner in place against a vehicle seat. This device prevents the prisoner from being able to move his hands and body sufficiently enough to release a seatbelt latch or unlock and open a door. This further prevents the prisoner from being able to move the handcuffs from back to front. The invention requires no major modification to the vehicle and it is relatively portable allowing for it to be removed and reinstalled into another vehicle.

The design of the current invention utilizes installation behind the seat to combat the force that a prisoner could possibly exert in order to defeat the locked secure position of the nylon strap. As the prisoner pulls against the strap, it is additionally being reinforced by its position behind the seat.

Some additional advantages to this invention are:

It causes minimal damage to a vehicle as a result of installation, and thus increases the vehicle resale value.

It can be easily moved from one vehicle and reinstalled into another.

It has a low profile design which allows the seat to still be utilized for non-prisoner passengers.

The low profile design and simplicity of use are less likely to create anxiety by the prisoner.

It provides an alternative to the use of a police cage.

In cases of emergency the transporting officer can release the prisoner by activating the remote switch. Additionally, the nylon strap can be cut with a knife or scissors to facilitate a quick release.

The brake for the spool containing the nylon strap is in a locked position when a 12-volt current is supplied to it by activation of the officer's remote-controlled switch. Should that current from the vehicle's battery be disrupted due to a collision, the brake disengages and the strap may be extracted allowing for the prisoner to exit the vehicle.

The device is used in conjunction with the use of the vehicle's seatbelts. It does not interfere with the normal operation of a vehicle's seatbelt.

THE DRAWINGS

A preferred embodiment of the invention is illustrated in the accompanying drawings in which.

DETAILED DESCRIPTION OF THE INVENTION

Figure 2:
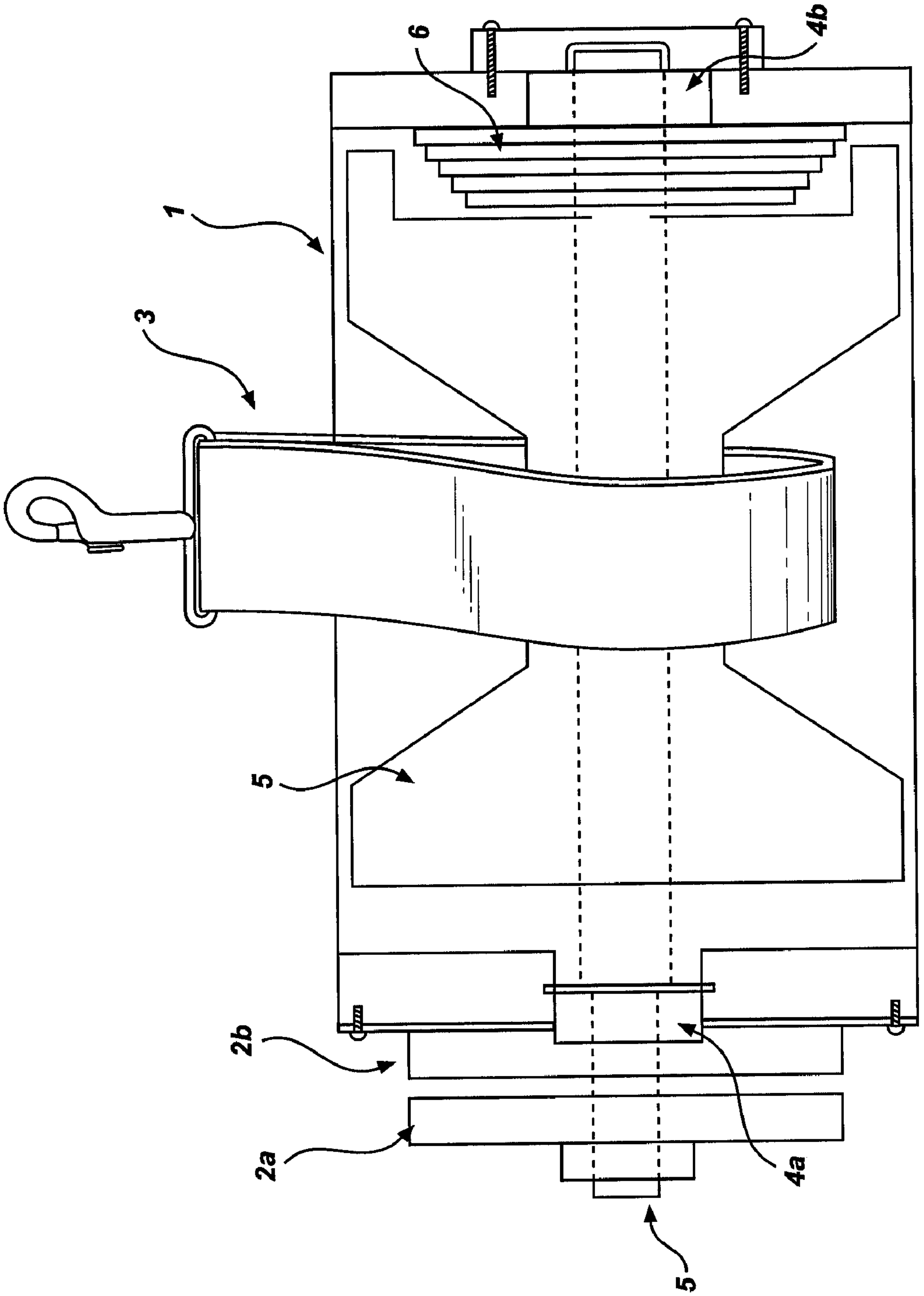
FIG. 2, is a cross section view of the device showing the inner workings and components. Again, the device is shown without a mounting system.

The retractable restraint device as shown in FIG. 2 consists of a cue assembly (FIG. 2(1)); electromagnetic brake (FIG. 2(2*a, b*)); a tether in the form of a strap assembly (FIG. 2(3)); sealed bearing assemblies (FIG. 2(4*a, b*)); shaft and spool assembly (FIG. 2(5)); return spring (FIG. 2(6)); and restraint strap (FIG. 2(3)).

The free end of the restraint strap (FIG. 2(3)) is allowed to pass from the case assembly (FIG. 2(1)) through an opening cut into the case assembly (FIG. 2(1)). The free end of the restraint strap (FIG. 2(3)) is intended to have a clasp or hook to attach to the restrained prisoner's handcuffs.

The restraint strap (FIG. 2(3)) is wound on the shaft and spool assembly (FIG. 2(5)) which is kept in a state of tension by return spring (FIG. 2(6)). This provides for the retraction of the restraint strap (FIG. 2(3)) when the invention is in the inactive mode. The shaft and spool assembly rides on the two bearing assemblies (FIG. 2(4*a, b*)) to allow free movement of the shaft in either direction when the invention is in the inactive mode.

The electromagnetic brake assembly (FIG. 2(2*a, b*)) is a two-piece device consisting of an electromagnet (FIG. 2(2*b*)) that is attached to the case assembly (FIG. 2(1)). The second part of the electromagnetic brake assembly (FIG. 2(2*a*)) is attached to the shaft with a set-screw and rotates with the shaft without interference from the electromagnet (FIG. 2(2*b*)) while the invention is in the inactive mode.

When voltage is applied (active mode) to the electromagnetic brake assembly (FIG. 2(2*a, b*)), part (FIG. 2(2*b*)) produces an electromagnetic force that pulls the friction material of the electromagnetic brake assembly (FIG. 2(2*a*)) into physical contact with the electromagnetic brake assembly part (FIG. 2(2*b*)). This binds the electromagnetic brake assembly (FIG. 2(2*a*)) which is attached to the shaft and spool assembly (FIG. 2(5)) to the electromagnetic brake assembly (FIG. 2(2*b*)) which is attached to the case assembly (FIG. 2(1)). This renders the shaft and spool assembly (FIG. 2(5)) locked and immovable preventing the strap assembly (FIG. 2(3)) from being pulled out of the case assembly (FIG. 2(1)).

Figure 1:
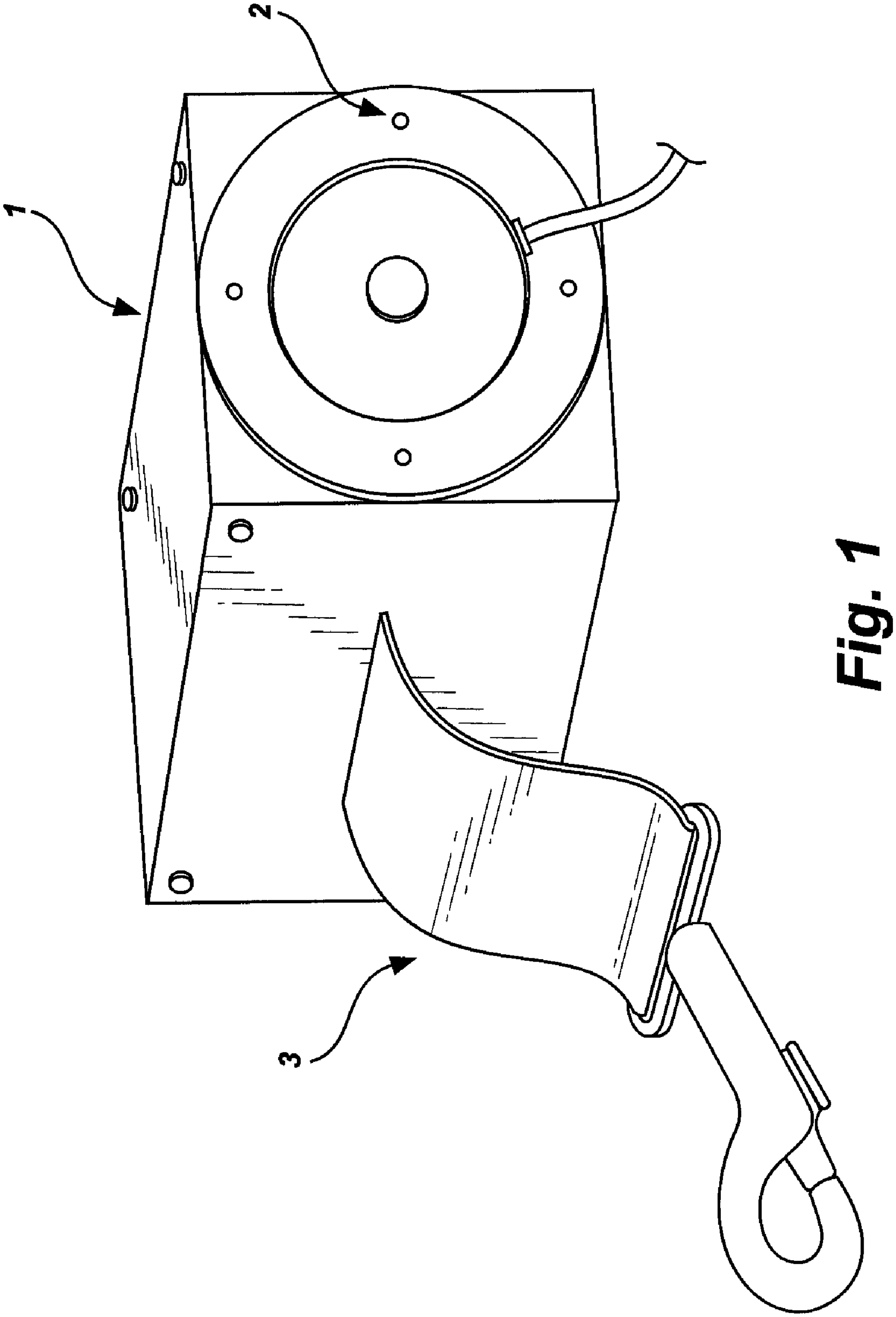
FIG. 1, is a view of the retractable restraint shown without a mounting system.
Figure 3:
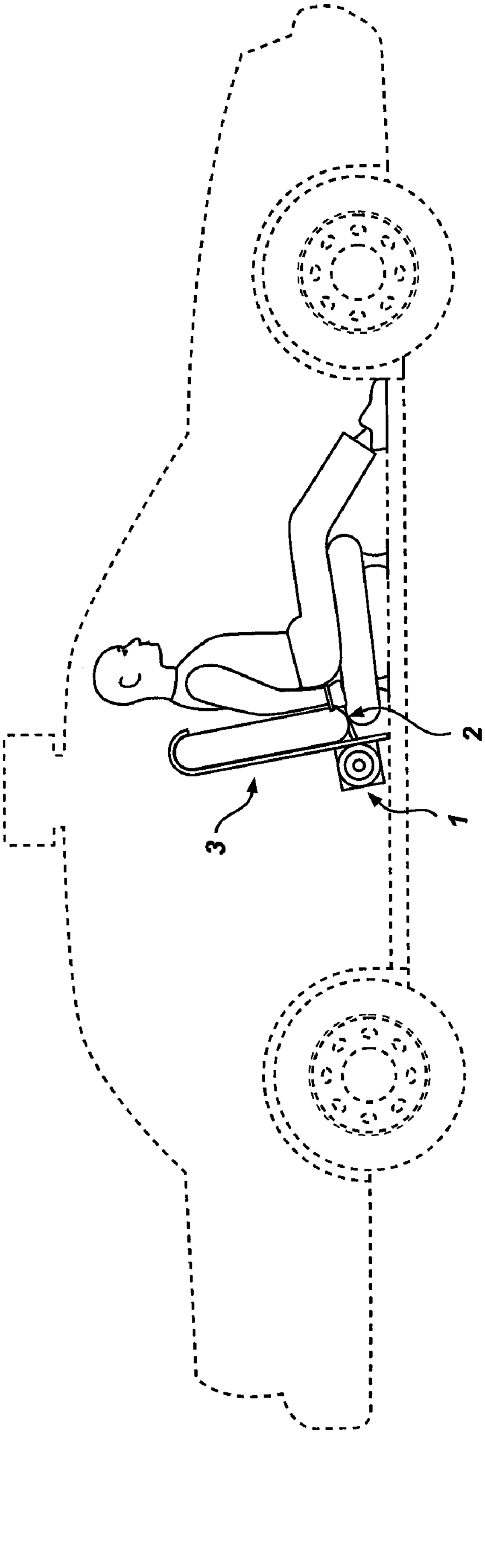
FIG. 3, is a side view of a patrol car with the retractable restraint mounted to the backside of the front passenger seat. The restraint strap passes through the gap between the bottom of the seat and the seat back and attaches to the prisoner's handcuffs.

As shown in FIG. 3, the retractable restraint (FIG. 1(1)) is mounted (FIG. 3(3)) to the backside of the front passenger seat. The strap assembly (FIG. 3(2)) is passed through the gap between the seat back and the seat bottom and attached to the prisoner's handcuffs.

Figure 4:
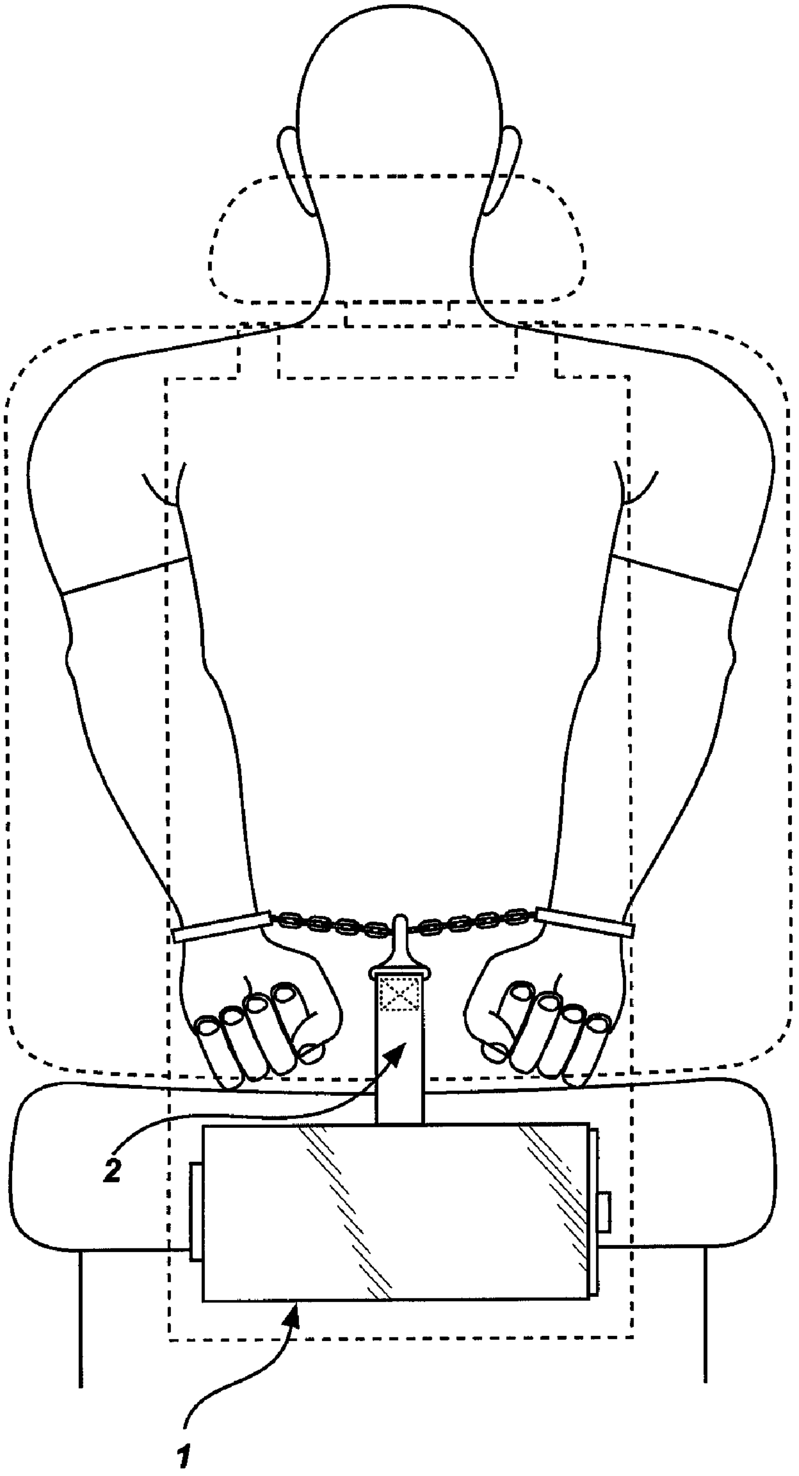
FIG. 4, is a rear view of the retractable restraint in use on the front passenger seat as shown in FIG. 3.

FIG. 4 shows the same example from a rear view.

When the retractable restraint described in this invention is used to restrain a prisoner in the front seat of a law enforcement vehicle, the following procedure would be followed. This procedure is discussed in further detail in U.S. patent application Ser. No. 11/396,330, which is expressly incorporated herein. The prisoner would be escorted to the open door of the vehicle. The strap assembly could either be simply lying on the seat and would need to be pulled out by the officer to hook to the handcuffs of the prisoner, or the strap assembly could be attached to the inside of the vehicle door with a hook-type device. This would allow the strap to be pulled out when opening the door allowing easy access. Since the invention is retractable, the strap would move in and out with the opening and closing of the door. In either case, the strap assembly would be attached to the handcuff of the prisoner, and the prisoner allowed to sit down in the seat. The retractable restraint would retract the excess strap as the prisoner sits down. Once the prisoner is seated, the officer would activate the retractable restraint. (This could be accomplished in any number of ways, including RF remote control, dash-mounted switch, or possibly a switch mounted on the rear of the device, out of the prisoner's reach.) Once the retractable restraint is activated, the electromagnetic brake would lock the shaft and spool assembly and the prisoner would be unable to exit the seat. Since, in most cases, the prisoner's knees would be higher in elevation than his hips, he would be at an anatomical disadvantage with respect to body leverage and would be less likely to overcome the strength of the electromagnetic brake assembly.

Upon arrival at a detention facility, the officer could remove the prisoner from the vehicle by deactivating the retractable restraint, thus freeing the shaft and spool assembly and allowing it to rotate freely. The prisoner could then exit the vehicle, pulling a length of strap assembly out as he/she stands up. The strap assembly would then be allowed to either retract back into the device, or be attached to the door as outlined above, making it ready for the next use.

By default, the retractable restraint is in an inactive state, meaning that as long as voltage is not applied to the electromagnetic brake assembly, the strap assembly is free to be pulled out of, or retract into, the device. This was a safety consideration in the design of the device since in the event of a mishap such as an accident, rollover or fire, power would most likely not be available to keep the device activated. A position sensor such as a mercury switch could be incorporated into the design to ensure that the device is only capable of being activated in an upright position.

The retractable restraint could be used in a variety of different applications including, but not limited to, restraining a prisoner in a courtroom, the back seat of a vehicle, or used with K9 Units.

We claim:

1. An apparatus for selectively holding a person in a seat, the apparatus comprising:
- a retractable restraint having a portion thereof configured for attachment to a person, the retractable restraint having an attached end configured for engaging a retraction mechanism and an unattached end, the unattached end having a clasp disposed thereon for enabling the retractable restraint to be connected to a person;
- a retraction mechanism configured to receive at least a portion of the retractable restraint and for selectively allowing extension of the retractable restraint;
- a locking member disposed in communication with the retraction mechanism configured to selectively lock the retraction mechanism and preventing extension of the retractable restraint; and
- a frame slidably mountable on and removable from a seat, the frame having at least one arm configured for extending over a portion of a seat so as to hold the frame adjacent a backside of the seat, the retraction mechanism and the locking member and being carried by the frame to hold the retraction mechanism and the locking member on the back side of the seat; and wherein the retraction mechanism has normally open configuration wherein the retractable restraint can be extended and retracted and a locked position configuration wherein the retractable restraint cannot be extended, and further comprising a manually operable remote control, remote from the retractable restraint, for selectively activating and releasing the locking member.

2. The apparatus of claim 1, wherein the frame comprises a pair of arms configured to fit over the top of a seat to hold the frame to the seat.

3. The apparatus of claim 1, further comprising a pair of handcuffs attached to the clasp.

4. A restraint system comprising: further comprising
- a seat having an upper backrest portion and a lower sitting portion,
- a retractable restraint having a portion thereof configured for attachment to a person, the retractable restraint having an attached end configured for engaging a retraction mechanism and an unattached end, the unattached end having a clasp disposed thereon;

a retraction mechanism configured to receive at least a portion of the retractable restraint and for selectively allowing extension of the retractable restraint;

a locking member disposed in communication with the retraction mechanism configured to selectively lock the retraction mechanism and preventing extension of the retractable restraint; and a frame slidably mountable on and removable from the seat, the frame having at least one arm configured for extending over the upper backrest portion of the seat so as to hold the frame adjacent a back side of the seat, the retraction mechanism and the locking member and being carried by the frame to hold the retraction mechanism and the lock member on the back side of the seat; and wherein the retractable restraint means extends from one side of the seat to the other between the upper backrest portion and the lower sitting portion.

5. An apparatus for selectively holding a person in a seat, the apparatus comprising:

a retractable tether configured to attach to a restraint mechanism on the person;

a retraction mechanism connected to the tether and further configured to retract the tether into a retracted position as the person sits in a seat;

an electromechanical lock configured to selectively prevent movement of the tether out of the retracted position to inhibit the person from getting out of the seat; and a user activated control, sufficiently remote from the person in the seat so as be out of reach of the person in the seat and configured for selectively locking the electromechanical lock.

6. The apparatus of claim 5, wherein the lock is configured to be remotely released when the person is authorized to exit the seat.

7. The apparatus of claim 5, wherein the remote is wireless.

8. The apparatus of claim 5, further comprising a car and wherein the remote is disposed on the dashboard.

9. An apparatus for selectively holding a person in a seat, the apparatus comprising:

a tether having a free end configured for attachment to a pair of handcuffs;

a retraction mechanism connected to the tether and configured to retract the tether as a person sits in a seat;

an attachment mechanism connected to the free end of the tether and configured to attach to the person to thereby limit movement of the person beyond the length of the tether;

an electromechanical lock configured to receive a signal and to prevent extension of the tether after receipt of the signal such that the person is held in the seat; and a user operated signal source providing the signal to the electromechanical lock and configured to signal a release to the electromechanical lock in the event of a mishap;

wherein the retraction mechanism and the lock are disposed on a frame having a pair of arms configured for extending over a seat to thereby hold the retraction mechanism and the lock behind the seat.

10. The apparatus of claim 9, further comprising a remote control for selectively locking or unlocking the lock from a location remote from the retention mechanism.

11. The apparatus of claim 9, wherein the attachment mechanism is configured to attach to a restraint mechanism on the person.

12. The apparatus of claim 9, wherein the retraction mechanism is biased to retract the tether.

13. An apparatus for selectively holding a person in a seat, the apparatus comprising:

a spring mounted spool;

a strap connected to the spool and configured to be passed between an upper and lower portion of a seat, and further configured to be extended to reach a person;

an attachment mechanism connected to the free end of the strap and configured to attach to the person;

an electromechanical lock configured to selectively lock the strap in a retracted position; and a user activated remote control, disposed at a distance remote from the strap as to be unreachable by a person attached to the strap when held in the seat and configured to selectively place the lock in a locked state.

14. The apparatus of claim 13, wherein the strap is a single strap having a first, unattached end having a clasp thereon and a second attached end attached to the spool.

15. The apparatus of claim 13, wherein the remote is a wireless remote.

16. An apparatus for selectively holding a person in a seat, the apparatus comprising:

a frame configured to be removably mounted in an automobile such that removal of the frame would return the automobile to its original and unaltered state before having mounted the frame in the automobile, the frame having a first side and a second side and arms extending forwardly from the first side, the arms being configured to hold the frame to the seat ;

a retraction mechanism mounted to the frame on the second side;

a tether connected to the retraction mechanism at one end and being selectively extendable out of the retraction mechanism to the first side of the frame past the arms, the tether having an attachment mechanism disposed thereon for attachment to the person and the tether being of sufficient length that the tether may extend so that the attachment mechanism is outside of the automobile while still attached to the person; and an electromechanical lock configured to selectively prevent release of the retraction mechanism to thereby hold the tether in a retracted position and hold the person in the seat.

17. The apparatus of claim 16, wherein the retraction mechanism is further configured to allow the person to exit the automobile while still attached to the retraction mechanism when the lock is selectively disengaged.

18. An apparatus for restraining a person wearing handcuffs comprising:

a retraction mechanism configured for retracting a tether, the retraction mechanism having a locked position and unlocked position;

a tether attached to the retraction mechanism at a first end and having an attachment mechanism remote from the first end for attaching the tether to a person, the attachment mechanism being configured for attachment to handcuffs worn by the person, the retraction mechanism allowing the tether to extend from the retraction mechanism when in the unlocked position and preventing further extension of the tether when the retraction member is in the locked position; and a user activated wireless remote control disposed beyond reach of a person attached to the first end of the tether for selectively placing the retraction mechanism in the locked position.

19. The apparatus of claim 18, wherein the apparatus further comprises a pair of handcuffs.

* * * * *